March 26, 1957 W. K. PATTON 2,786,373
STRAIGHT FLUTE DRILLING CUTTER
Filed Dec. 14, 1953

Inventor
William K. Patton
By Alan Awabey
Attorney

2,786,373

STRAIGHT FLUTE DRILLING CUTTER

William Kenneth Patton, Sherbrooke, Quebec, Canada

Application December 14, 1953, Serial No. 398,180

2 Claims. (Cl. 77—67)

The present invention relates to drilling tools and, more particularly, to a drilling cutter particularly suited for deep hole drilling in metal.

While, at the present time, many types of drills or boring bits are available for the drilling of holes through heavy metal stock or castings, most of these, particularly when used in production work, have to be frequently ground and sharpened for their effective operation. It is common practice when drilling large diameter holes in metal to first drill a hole of a considerably lesser diameter than the finished hole desired and then re-drill with one or more larger drills. At the present time, stepped drills are available having more than one diameter wherein each diameter is in effect a separate drill with the flute arrangement and web thickness between the flutes being the same as a standard drill and therefore susceptible to the same failings.

The present invention recognizes these problems and aims to provide a drilling cutter that is capable of drilling or boring any size of a hole in one operation.

More specifically, the invention is a drilling cutter which comprises a cutter body of gradually decreasing stepped diameter from a top portion of the maximum diameter constituting the boring size down to a minimum diameter terminating in the cutting point. A pair of diametrically opposed flutes are provided which extend the length of the cutter and provision is made, in the form of a boring, extending axially through the body from the top portion to adjacent the point with communicating openings extending diagonally outwards to each of the flutes to provide fluid-conducting passages for the purpose of lubrication and cooling. The formation of the body and flutes are such that the intervening web between the flutes increases in thickness relative to the graduated diameter of the body. As the distance from the point of the cutter to the back or rear of the cutter increases, the material or web thickness between the flutes increases also.

The flutes are a combination of angles and radii over their length and are necessarily so as to ensure the cuttings or material removed during the drilling operation are lifted up through the flutes in order to allow the coolant or lubricant to reach the cutting edges of the cutter.

The cutting edge at the smallest diameter is approximately fifteen degrees (15°) and gradually decreases to zero degrees (0°) at the largest diameter. These angles remain constant as the radius of the flute is calculated in proportion to any given diameter size of the cutter. The purpose of the cutting angle decreasing as it nears the back of the flute or cutter body is necessary in order to produce a different shaped tool chip which causes the chip to break more freely, thus decreasing the pressure on the chips cut by the point of the tool body. The flutes extend the length of the cutter from the top portion to the point with the depth of the flute varying adjacent the root line near the point of the tool and developing into straight angles adjacent the top portion of the tool. The reason for this variation is to provide a recess or depression adjacent the point of the tool into which the cooling or lubricating fluid can flow during the drilling operation.

In the preferred construction, each step of the cutting tool is defined by straight, parallel annular portions of gradually decreasing diameter which, when divided by the flutes, provide multiple cutting edges or faces.

Having thus generally described the nature of the invention, particular reference will be made in the accompanying drawings wherein there is shown by way of illustration a preferred embodiment thereof, and in which.

Figure 1:
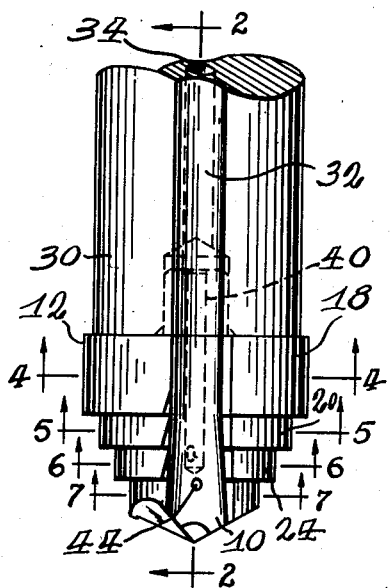
Figure 1 is a view in side elevation of a cutter body constructed in accordance with the invention with a driver shank secured to the cutter body.
Figure 2:
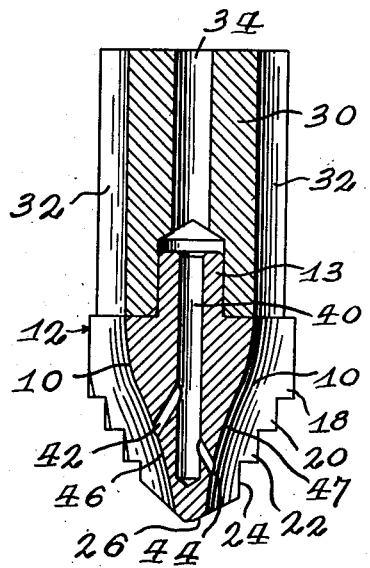
Figure 2 is a cross-sectional view of the construction shown in Figure 1 along the line 2—2 to illustrate in more detail the formation of the cutter body and the arrangement of the internal fluid-conducting passages.
Figure 4:
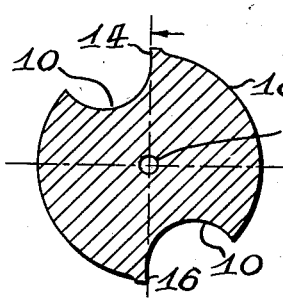
Figure 4 is a cross-sectional view of the cutter construction shown in Figure 1 along the line 4—4 to illustrate the zero angle between the centre line of the cutter body and the cutting edge of the maximum diameter portion.
Figure 5:
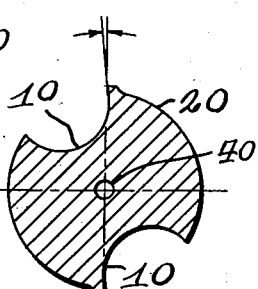
Figure 5 is a cross-sectional view of the construction shown in Figure 1 along the line 5—5 to illustrate the slight variation in cutting angle from the center of the tool at the second largest diameter.
Figure 3:
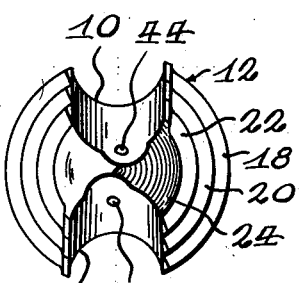
Figure 3 is an end view looking from the point of the cutter construction shown in Figure 1.
Figure 6:
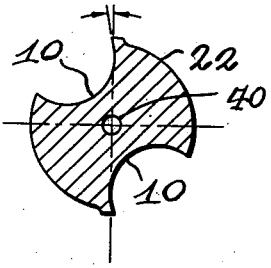
Figure 6 is a sectional view of the cutter construction shown in Figure 1 along the line 6—6 to show the variation in angle relative to the center line to the cutting face at the third diameter portion of the cutter.
Figure 7:
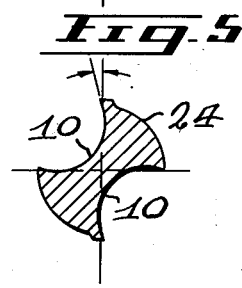
Figure 7 is a cross-sectional view along the line 7—7 of Figure 1 to show the maximum variation from center line of the cutting edge at the smallest diameter of the cutter.

With particular reference to Figures 1 and 2 of the drawings, there is shown a preferred embodiment of a cutter in accordance with the invention. For the purpose of illustration, this cutter body is shown as being approximately an inch and three-quarters in diameter, at the maximum diameter, with three-eighths radius flutes provided along the length of the cutter. The flutes 10 in the cutter body are disposed at an angle relative to the axis of the body so that they slant inwardly towards the lower portion of the body and are diametrically opposed with one lateral edge of each flute aligned with a plane parallel to and passing through the tool axis so as to define the cutting edges 14 and 16. It will be appreciated that the dimensions given are illustrative only and that the dimensions of the cutter body and flutes can be varied for any desired size required, providing that proportionately these dimensions are retained.

The cutter body illustrated has, as previously described, a maximum diameter portion 18 and gradually decreasing diameter body portions 20, 22 and 24. The minimum diameter portion 24 is ground and formed to provide a cutting point 26.

In the construction illustrated, the cutter body 12 is provided with a spigot or projection 13 on the rear face of the maximum diameter portion 18 for the purpose of locating a driver or shank 30 with the cutter body. The flutes 32 on the driver 30 are straight to suit the drilling cutter shown. The rear surface of the back of the maximum diameter portion 18 is flat to add strength to the driver when the cutter has been made solid with the driver by the usual bonding with silver solder or the like.

The driver body 30 is provided with a central bore or opening 34 which extends axially through the driver to communicate with a corresponding opening or bore 40 extending axially through the center of the cutter body 12 from the top of the spigot 13 to adjacent the point 26. The center bore or opening 40 is met by further openings or passages 42, 44 which extend from the center of the flutes adjacent the cutter portions 24, 22 so as to constitute passages for the flowing of lubricant or cooling liquids.

As the cutter body gradually decreases in diameter from the top portion 18 down to the portion 20, 22 and 24 and as the radius of the flutes remains constant the cutting edge also varies in angle relative to the plane parallel to and passing through the axis of the cutter. As is shown in Figures 4 through 7, at the maximum diameter portion 18 the angle is zero, at the diameter portion 20 the angle is approximately five degrees, at the portion 22 the angle is approximately ten degrees, and at the minimum diameter portion 24 the angle is approximately fifteen degrees (15°). As is well known, the reduction in angle of the cutting edge relative to the centre line of the cutter tightens the spiral of the cut chip so that the chips cut by the top portion of the tool will flow out more freely along the top portion of the flute enabling the looser wound chips cut by the point of the tool to more easily migrate through the tool point. The purpose of the decreasing of the cutting angle as it nears the back of the flute or maximum diameter portion is necessary so as to produce a different shaped chip which causes it to break more freely, thus decreasing the pressure on the chips produced by the tool point in cutting operation.

As the distance from the point of the cutter to the maximum diameter increases the material thickness or web between the flutes increases proportionately. That is to say, the radial dimensions from the axis of the body to the bottom of the flutes progressively increase proportionately to the increased diameter of the body. This provides the maximum of material between the cutting edges of the maximum diameter cutter portion, where it is needed, and the web gradually decreases to the minimum adjacent the cutting point. The flutes are varied in depth adjacent the root line or point of the cutting tool as indicated at 46, 47 to provide a radius allowing for the delivery of lubricant or coolant fluid to the cutting edges of the tool in operation.

Preferably, the lubricant passages 42, 44 meet the center opening 40 at an angle of approximately thirty-five degrees (35°) from the axis of the tool body and in combination with the recesses provided in the flutes provide a means of supplying sufficient cooling and lubricating liquid and they also serve to force the cuttings back up through the flutes when the cutter is in operation.

I claim:

1. A deep hole metal drilling cutter adapted for use in combination with an elongated driver body having an axial lubricant conducting bore, comprising a cutter body of gradually decreasing stepped diameter from a top portion of maximum diameter constituting the final boring size to a bottom portion of minimum diameter terminating in a cutting point, said top portion having an axially located spigot projection adapted for interconnection with said driver body, a pair of diametrically opposed flutes disposed at an angle relative to and extending inwardly towards the axis of said body from said portion of maximum diameter to said portion of minimum diameter, one lateral edge of each of said flutes being aligned with a plane parallel to and extending through the axis of said body to define opposed cutting edges in each of said body portions, said flutes being of constant radius and extending the length of said body so as to intersect each of said body portions of varying diameter, whereby the radial dimensions of the body portions from the axis of said body to the bottom of said flutes increase progressively and proportionately from the point of said body to the top of said body relative to the external diameter of said body at these points, a bore extending axially through said body and spigot to terminate slightly above said cutting point, and additional bores extending at an angle relative to and from said axial bore to open into said flutes to constitute fluid conducting passages.

2. A deep hole metal drilling cutter, as claimed in claim 1, wherein each stepped diameter portion of said body is of annular formation having parallel top and bottom surfaces transverse to the axis of said tool body and peripheral side surfaces parallel to the axis of said body.

References Cited in the file of this patent
UNITED STATES PATENTS

| | | |
|---|---|---|
| 1,603,739 | Borgeson | Oct. 19, 1926 |
| 2,032,328 | Reedy | Feb. 25, 1936 |
| 2,258,168 | Creighton | Aug. 12, 1941 |
| 2,325,973 | Nurnberger et al. | Aug. 3, 1943 |
| 2,555,746 | Horsky et al. | June 5, 1951 |
| 2,648,524 | Dionisotti | Aug. 11, 1953 |